UNITED STATES PATENT OFFICE.

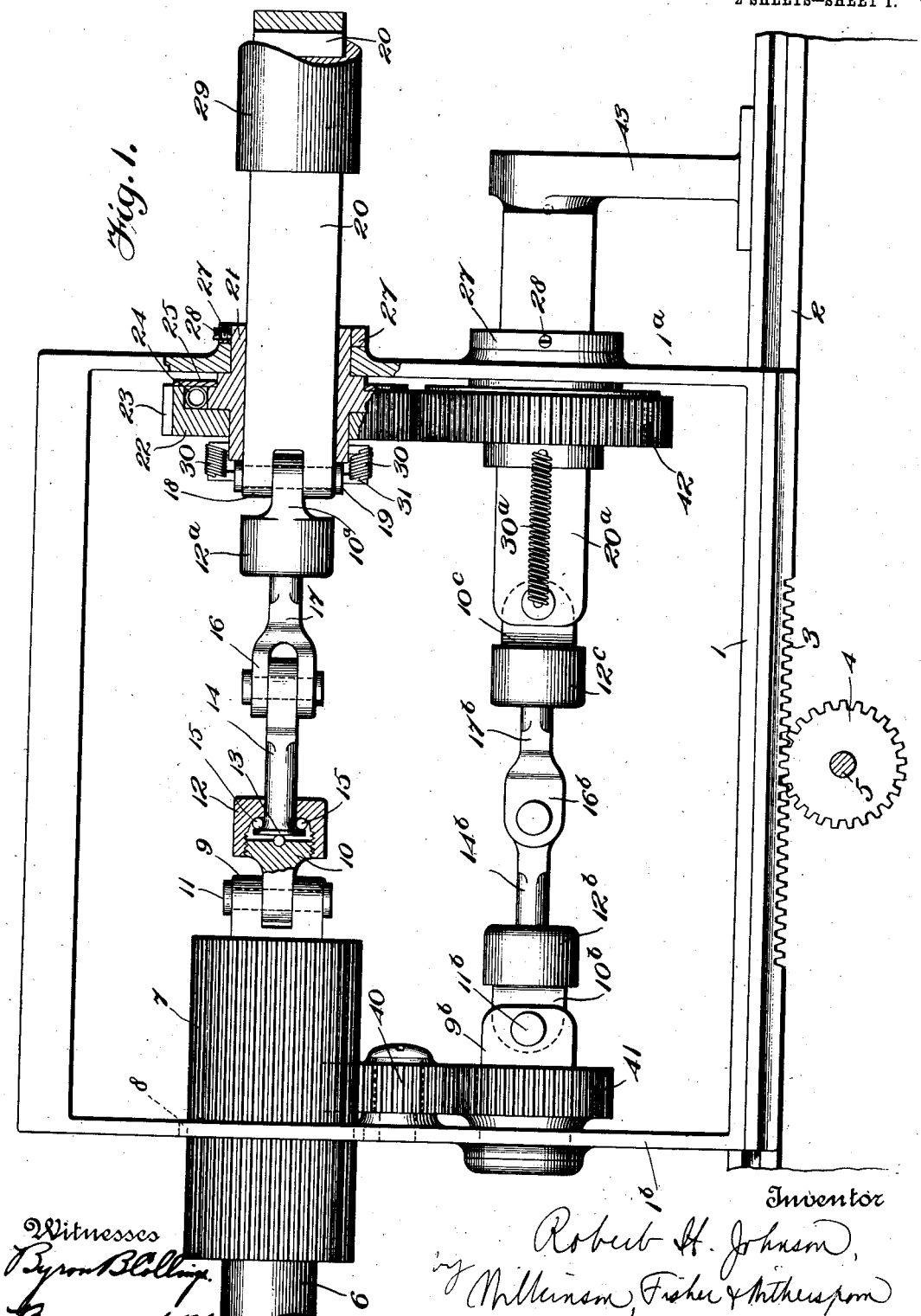

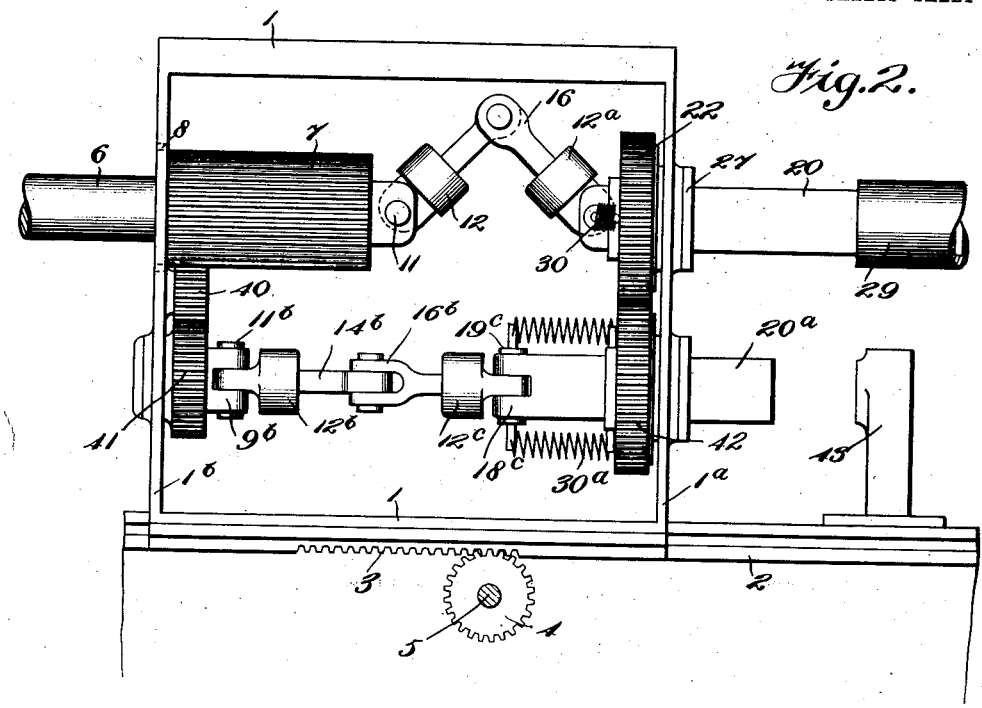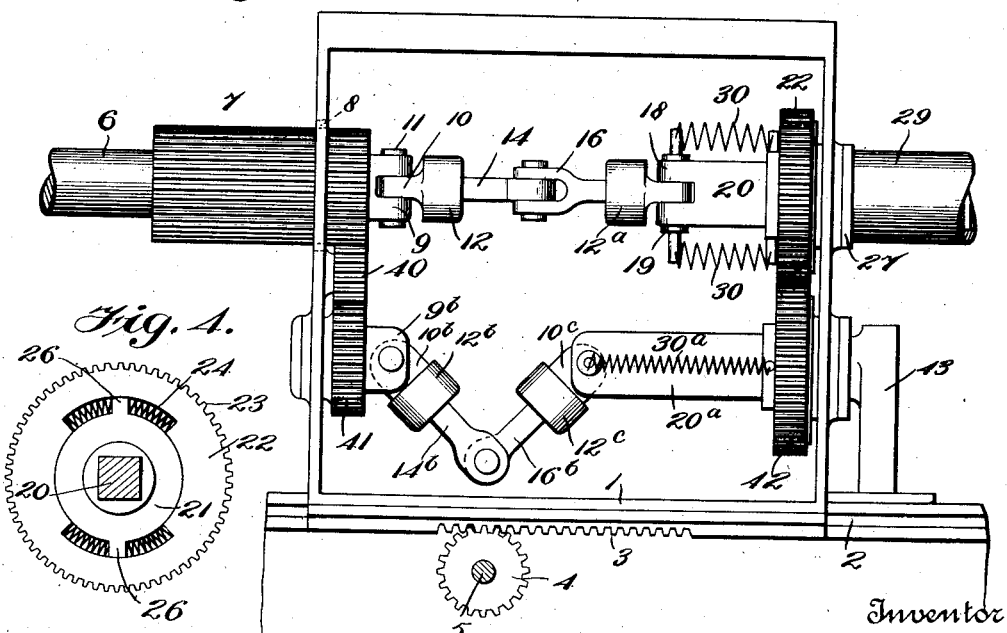

ROBERT HENRY JOHNSON, OF WASHINGTON, DISTRICT OF COLUMBIA.

REVERSIBLE DRIVING MECHANISM.

1,037,922.  Specification of Letters Patent.  Patented Sept. 10, 1912.

Application filed December 21, 1911. Serial No. 667,243.

*To all whom it may concern:*

Be it known that I, ROBERT H. JOHNSON, a citizen of the United States, residing at Washington, in the District of Columbia, have invented certain new and useful Improvements in Reversible Driving Mechanism; and I do hereby declare the following to be a full, clear, and exact description of the invention, such as will enable others skilled in the art to which it appertains to make and use the same.

My invention relates to mechanism for transmitting motion in reverse directions from a drive shaft to a driven shaft, and it relates more especially to reversible driving mechanism, which may be used to connect the driving shaft to the driven shaft for turning the latter in either direction, and for turning the driven shaft at substantially the same speed in either direction, or for permitting same to remain without turning.

My invention is especially adapted for use in connecting the propeller shaft of a motor boat to the driving shaft, and for use in various other relations where it is desired to drive the driven shaft in reverse directions at high speeds, or to prevent the driven shaft from rotating without stopping the engine.

My invention will be understood by reference to the accompanying drawings, in which the same parts are indicated by the same numerals throughout the several views.

Figure 1 is a side elevation of the device, with the parts in the position when the drive shaft is rotating, but the driven shaft is not rotating, parts being shown in section. Fig. 2 shows the mechanism in the position for turning the driven shaft in one direction, or ahead. Fig. 3 shows the mechanism in the position for turning the driven shaft in the reverse direction, or astern, and Fig. 4 is a detail showing in side elevation one of the yielding gears.

1 shows a suitable frame, in which the various gear wheels are mounted, which frame slides upon a suitable bed plate 2, and is reciprocated in any convenient way, as by means of the rack 3 and pinion 4, which pinion is mounted on the shaft 5, which shaft may be driven by a hand wheel, a hand lever, a pulley, or in any other convenient or well known way. The frame 1 has two end members 1ᵃ and 1ᵇ. The end member 1ᵇ is perforated, as at 8, to permit the free passage therethrough of the elongated gear 7, mounted on the driven shaft 6, which is driven from the engine in any suitable way. The end of this shaft 6 carries a yoke 9, in which the tongue 10 is held by means of the pin 11. This tongue 10 is provided with a hollow cap 12, in which projects the head 13 of the toggle member 14, and antifriction balls 15 are provided in said hollow cap, as shown in Fig. 1. This toggle member 14 is hinged to the yoke 16 of the toggle member 17, whose head is generally similar to that of the toggle member 14, and is revolubly mounted in the cap 12ᵃ, generally similar to the cap 12, which cap is connected by the tongue 10ᵃ, generally similar to the tongue 10, to the yoke 18 by means of the pin 19. This yoke 18 is integral with the squared shaft 20, which shaft is mounted to slide in the sleeve 21, carrying the ring 22, provided with gear teeth 23. To prevent stripping, springs 24 are interposed between the ring 22 and the lugs 26 on the sleeve 21, as shown in detail in Fig. 4. A face plate 25 covers the pockets for the springs 24, as shown in Fig. 1; and a set collar 27, held in place by the screw 28, holds the sleeve 21 against longitudinal motion in the end member 1ᵃ of the frame 1. The shaft 20 is provided with a cylindrical sleeve 29, to engage in suitable journal bearings (not shown). Springs 30 are provided, connecting the sleeve 21 with the projecting ends of the pin 19, which springs tend normally to keep the toggle joint formed by the members 17 and 14 in the distended, or straight position.

An idle pinion 40 is journaled on a stub shaft carried by the end member 1ᵇ of the frame 1, and this idler meshes in the gear wheel 41, mounted on a second stub shaft, which is provided with the yoke 9ᵇ, similar to the yoke 9 already described; and the pin 11ᵇ, tongue 10ᵇ, hollow cap 12ᵇ, toggle member 14ᵇ, yoke 16ᵇ, toggle member 17ᵇ, hollow cap 12ᶜ, tongue 10ᶜ, springs 30ᵃ, and squared shaft 20ᵃ are generally similar to the parts 9 to 17, and 20 and 30 already described. The shaft 20ᵃ slides through a sleeve generally similar to that already described as shown in Fig. 4, on which sleeve a ring carrying the gear teeth 42 is provided.

The general construction of the gears 22, 41, and 42 is shown in Fig. 4. It will be noted that the stub shaft on which the gear 41 is mounted and the shaft 20ᵃ constitute a broken shaft having the same axis, the two members of which are connected together by the toggle members 14$^b$ and 17$^b$ and the universal joints hereinbefore described; and this broken shaft constitutes a reversing shaft for transmission of the rotary motion of the drive shaft in the reverse direction to the driven shaft. The shaft 20$^a$ is free to slide through the gear 42; and when the toggle members 14$^b$ and 17$^b$ are in the straight or distended position, this shaft 20$^a$ brings up against a stop 43, carried by the bed plate 2.

The operation of the device is as follows:—Suppose the parts to be in the position shown in Fig. 1, and the shaft 6 to be in rotation, this shaft will drive the idler 40 and the gear 41, but the two toggle joints being in the straight or distended position, and being provided with loose caps 12 and 12$^b$, with antifriction bearings, these caps will rotate without throwing the toggle joints out of alinement, and without causing the mechanism to impart any motion whatever to either of the shafts 20 or 20$^a$. The springs 30 and 30$^a$ will tend to keep these toggle joints in the elongated, or straight position against the action of any centrifugal force, tending to bend the joint. Now suppose it is desired to go ahead, this is effected by rotating the shaft 5, causing the rack 3 and frame 1 to reach the position shown in Fig. 2. Centrifugal force will throw the toggle connecting the shafts 6 and 20 to the position shown in Fig. 2, the springs 30 being then inoperative, and the rotary motion of the shaft 6 will be directly communicated to the shaft 20. At this time, the springs 30$^a$ will hold the reversing toggle in the distended position, as shown in the lower portion of Fig. 2; and no power will be transmitted from the gear 41 to the gear 42, although these gears will both be in rotation. In order to reverse the mechanism, rotate the pinion 4 in the opposite direction until the rack 3 and frame 1 assume the position shown in Fig. 3. During this movement of the frame 1, the shaft 20$^a$ will strike the stop 43, causing the gear 42 to slide on the shaft 20$^a$, and stretching the springs 30$^a$. At the same time, centrifugal force will cause the reversing toggle joint to bend, as shown in Fig. 3; and the motion will be transmitted from the gear 7 through the idler 40 and gear 41, and the reversing toggle to the shaft 20$^a$, and from the gear 42 to the gear 22; and this will turn the shaft 20 and sleeve 29 in the reverse direction from that in which the parts are shown in Fig. 2.

To prevent the various gears from stripping, I provide the spring arrangement connecting the sleeves and the rings carrying the gear teeth, as shown in Fig. 4.

It will be noted that in reversing, the coupling passes from the position for going ahead through the dead center, or position when neither toggle joint is rotating, as shown in Fig. 1, and then to the position for reversing; and while this reversal may be accomplished very rapidly, at the same time there is a short interval when the power applied to the drive shaft is entirely cut off from the driven shaft, and this brief interval in a large measure protects the apparatus from those injuries, due to sudden shock, which are likely to occur when the motion of driven mechanism is suddenly reversed.

While I have shown both ends of the toggle joint connecting the drive shaft and the driven shaft, and also both ends of the toggle joint connecting the two members of the reversing shaft, as freely revoluble relative to said shafts, it will be obvious that it will only be necessary to have one member of each toggle joint so revolubly connected, whereby there may be free relative rotary movement between the toggle joint and the shaft driving the same when the toggle joint is in the straight, or extended position.

It will be obvious that any suitable means for reciprocating the frame 1 may be adopted, and I do not intend to limit my invention to any specific means for accomplishing this purpose, nor do I mean to limit my invention to any specific arrangement of frame, gears, or the like, as various modifications might be made in the herein described construction, combination, and arrangement of parts, which might be used without departing from the spirit of my invention.

Having thus described my invention, what I claim and desire to secure by Letters Patent of the United States is:—

1. Mechanism for transmitting rotary motion, comprising a drive shaft and a driven shaft, a toggle joint, a pivoted swivel joint revolubly connecting said toggle joint to one of said shafts, and a pivoted swivel joint connecting said toggle joint to the other of said shafts, and means for moving one of said shafts longitudinally thereby bending said toggle joint, and transmitting motion from the drive shaft to the driven shaft, substantially as described.

2. Mechanism for transmitting rotary motion, comprising a drive shaft, and a driven shaft, a toggle joint, a pivoted swivel joint with antifriction bearings revolubly connecting said toggle joint to one of said shafts, and a pivoted swivel joint connecting said toggle joint to the other of said shafts, and means for moving one of said shafts longitudinally thereby bending said toggle joint, and transmitting motion from the drive shaft to the driven shaft, substantially as described.

3. Mechanism for transmitting rotary motion, comprising a drive shaft and a driven shaft, a toggle joint, a pivoted swivel joint revolubly connecting said toggle joint to one of said shafts, and a pivoted swivel joint connecting said toggle joint to the other of said shafts, and means for moving said driven shaft longitudinally thereby bending said toggle joint, and transmitting motion from the drive shaft to the driven shaft, substantially as described.

4. Mechanism for transmitting rotary motion, comprising a drive shaft and a driven shaft, a toggle joint, a pivoted swivel joint revolubly connecting said toggle joint to one of said shafts, and a pivoted swivel joint connecting said toggle joint to the other of said shafts, and means for moving said driven shaft longitudinally thereby bending said toggle joint, and transmitting motion from the drive shaft to the driven shaft, substantially as described.

5. Mechanism for transmitting rotary motion, comprising a drive shaft and a driven shaft, a toggle joint, a pivoted swivel joint revolubly connecting said toggle joint to one of said shafts, and a pivoted swivel joint connecting said toggle joint to the other of said shafts, means for normally holding said toggle joint in the straight or distended position, and means for moving one of said shafts longitudinally thereby bending said toggle joint, and transmitting motion from the drive shaft to the driven shaft, substantially as described.

6. Mechanism for transmitting rotary motion, comprising a drive shaft and a driven shaft, a toggle joint, a pivoted swivel joint revolubly connecting said toggle joint to one of said shafts, and a pivoted swivel joint connecting said toggle joint to the other of said shafts, springs under tension for normally holding said toggle joint in the straight or distended position, and means for moving one of said shafts longitudinally thereby bending said toggle joint, and transmitting motion from the drive shaft to the driven shaft, substantially as described.

7. Mechanism for transmitting rotary motion, comprising a drive shaft and a driven shaft, a toggle joint, a pivoted swivel joint revolubly connecting said toggle joint to one of said shafts, and a pivoted swivel joint connecting said toggle joint to the other of said shafts, means for normally holding said toggle joint in the straight or distended position, and means for moving said driven shaft longitudinally thereby bending said toggle joint, and transmitting motion from the drive shaft to the driven shaft, substantially as described.

8. Mechanism for transmitting rotary motion, comprising a drive shaft and a driven shaft, a toggle joint, a pivoted swivel joint revolubly connecting said toggle joint to one of said shafts, and a pivoted swivel joint connecting said toggle joint to the other of said shafts, springs under tension for normally holding said toggle joint in the straight or distended position, and means for moving said driven shaft longitudinally thereby bending said toggle joint, and transmitting motion from the drive shaft to the driven shaft, substantially as described.

9. Mechanism for transmitting rotary motion, comprising a drive shaft and a driven shaft, a toggle joint, pivoted swivel joints revolubly connecting said toggle joint to each of said shafts, means for normally holding said toggle joint in the straight or distended position, and means for moving one of said shafts longitudinally thereby bending said toggle joint, and transmitting motion from the drive shaft to the driven shaft, substantially as described.

10. Mechanism for transmitting rotary motion, comprising a drive shaft and a driven shaft, a toggle joint, pivoted swivel joints revolubly connecting said toggle joint to each of said shafts, springs under tension for normally holding said toggle joint in the straight or distended position, and means for moving one of said shafts longitudinally thereby bending said toggle joint, and transmitting motion from the drive shaft to the driven shaft, substantially as described.

11. Mechanism for transmitting rotary motion, comprising a drive shaft and a driven shaft, a toggle joint, a pivoted swivel joint revolubly connecting said toggle joint to one of said shafts, and a pivoted swivel joint connecting said toggle joint to the other of said shafts, an interrupted reversing shaft comprising two members, a second toggle joint with pivoted swivel connection connecting the said members with a revoluble connection between said second toggle joint and one member of said reversing shaft, gearing connecting said drive shaft with one member of said reversing shaft, gearing connecting said driven shaft with the other member of said reversing shaft, and means for moving either one of said shafts longitudinally thereby bending one of said toggle joints, and transmitting motion from the drive shaft to the driven shaft, substantially as described.

12. Mechanism for transmitting rotary motion, comprising a drive shaft and a driven shaft, a toggle joint, a pivoted swivel joint with antifriction bearings revolubly connecting said toggle joint to one of said shafts, and a pivoted swivel joint connecting said toggle joint to the other of said shafts, an interrupted reversing shaft comprising two members, a second toggle joint with pivoted swivel connections connecting the said members with a revoluble connection between said second toggle joint and one member of said reversing shaft, gearing connecting said drive shaft with one member of said reversing shaft, gearing connecting said driven shaft with the other member of said reversing shaft, and means for moving either one of said shafts longitudinally thereby bending one of said toggle joints, and transmitting motion from the drive shaft to the driven shaft, substantially as described.

13. Mechanism for transmitting rotary motion, comprising a drive shaft and a driven shaft, a toggle joint, a pivoted swivel joint revolubly connecting said toggle joint to one of said shafts, and a pivoted swivel joint connecting said toggle joint to the other of said shafts, an interrupted reversing shaft comprising two members, a second toggle joint with pivoted swivel connections connecting the said members with a revoluble connection between said second toggle joint and one member of said reversing shaft, gearing connecting said drive shaft with one member of said reversing shaft, gearing connecting said driven shaft with the other member of said reversing shaft, means for normally holding said toggle joints in the straight or distended position, and means for moving either one of said shafts longitudinally thereby bending one of said toggle joints, and transmitting motion from the drive shaft to the driven shaft, substantially as described.

14. Mechanism for transmitting rotary motion, comprising a drive shaft and a driven shaft, a toggle joint, a pivoted swivel joint revolubly connecting said toggle joint to one of said shafts, and a pivoted swivel joint connecting said toggle joint to the other of said shafts, an interrupted reversing shaft comprising two members, a second toggle joint with pivoted swivel connections connecting the said members with a revoluble connection between said second toggle joint and one member of said reversing shaft, gearing connecting said drive shaft with one member of said reversing shaft, gearing connecting said driven shaft with the other member of said reversing shaft, springs under tension for normally holding said toggle joints in the straight or distended position, and means for moving either one of said shafts longitudinally thereby bending one of said toggle joints, and transmitting motion from the drive shaft to the driven shaft, substantially as described.

15. Mechanism for transmitting rotary motion, comprising a drive shaft and a driven shaft, a toggle joint, pivoted swivel joints revolubly connecting said toggle joint to each of said shafts, and a pivoted swivel joint connecting said toggle joint to the other of said shafts, an interrupted reversing shaft comprising two members, a second toggle joint with pivoted swivel connections connecting the said members with a revoluble connection between said second toggle joint and one member of said reversing shaft, gearing connecting said drive shaft with one member of said reversing shaft, gearing connecting said driven shaft with the other member of said reversing shaft, means for normally holding said toggle joints in the straight or distended position, and means for moving either one of said shafts longitudinally thereby bending one of said toggle joints, and transmitting motion from the drive shaft to the driven shaft, substantially as described.

16. Mechanism for transmitting rotary motion, comprising a drive shaft and a driven shaft, a toggle joint, pivoted swivel joints revolubly connecting said toggle joint to each of said shafts, and a pivoted swivel joint connecting said toggle joint to the other of said shafts, an interrupted reversing shaft comprising two members, a second toggle joint with pivoted swivel connections connecting the said members with a revoluble connection between said second toggle joint and one member of said reversing shaft, gearing connecting said drive shaft with one member of said reversing shaft, gearing connecting said driven shaft with the other member of said reversing shaft, springs under tension for normally holding said toggle joint in the straight or distended position, and means for moving either one of said shafts longitudinally thereby bending one of said toggle joints, and transmitting motion from the drive shaft to the driven shaft, substantially as described.

In testimony whereof, I affix my signature, in presence of two witnesses.

ROBERT HENRY JOHNSON.

Witnesses:
  B. H. DAILEY,
  D. LEWIS MATTERN.